US011250404B2

(12) United States Patent
Xia (10) Patent No.: US 11,250,404 B2
(45) Date of Patent: Feb. 15, 2022

(54) TRANSACTION SCHEME FOR OFFLINE PAYMENT (71) Applicant: Advanced New Technologies Co., Ltd., George Town (KY)

(72) Inventor: Jupeng Xia, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 154 days.

(21) Appl. No.: 15/805,205

(22) Filed: Nov. 7, 2017

(65) Prior Publication Data

US 2018/0068290 A1 Mar. 8, 2018

Related U.S. Application Data (63) Continuation of application No. PCT/CN2016/080017, filed on Apr. 22, 2016.

(30) Foreign Application Priority Data

May 25, 2015 (CN) .......................... 201510272052.9

(51) Int. Cl.
*G06Q 20/20* (2012.01)
*H04L 29/06* (2006.01)
(Continued)

(52) U.S. Cl.
CPC ....... *G06Q 20/206* (2013.01); *G06Q 20/3276* (2013.01); *G06Q 20/401* (2013.01);
(Continued)

(58) Field of Classification Search
CPC .... G06Q 20/20; G06Q 20/385; G06Q 20/206; G06Q 20/3276; G06Q 20/401;
(Continued)

(56) References Cited

U.S. PATENT DOCUMENTS 7,739,197 B2 * 6/2010 Jambunathan ....... G06Q 20/382
705/65
8,117,450 B2 * 2/2012 Krawetz ............... H04L 9/3247
380/28
(Continued)

FOREIGN PATENT DOCUMENTS

| CN | 102369547 | 3/2012 |
| CN | 102740341 | 10/2012 |

(Continued)

OTHER PUBLICATIONS

S. Dinparast, M. G. Bakhtiari and M. Shajari, "A mobile payment scheme using 2D-barcode," The 5th Conference on Information and Knowledge Technology, 2013, pp. 400-405, doi: 10.1109/IKT.2013.6620100. (Year: 2013).*

(Continued)

*Primary Examiner* — Mamon Obeid
*Assistant Examiner* — Jahed Ali
(74) *Attorney, Agent, or Firm* — Fish & Richardson P.C.

(57) ABSTRACT

An authentication factor is received, including an authentication key, an account information of a user, and a dynamic time factor. A bound authentication information is generated by using the authentication factor and a device information of a client device that requested the secure offline payment. The bound authentication information is transmitted to a service server system perform an offline payment authorization based on the bound authentication information. In response to a successful offline payment authorization, a graphical identifier is generated for completing the secure offline payment associated with the authentication factor, where the graphical identifier includes the bound authentication information and a dynamic password generated based on the dynamic time factor.

11 Claims, 6 Drawing Sheets (51) Int. Cl.
  *G06Q 20/32* (2012.01)
  *G06Q 20/40* (2012.01)
  *G06Q 30/06* (2012.01)
(52) U.S. Cl.
  CPC ......... *G06Q 30/06* (2013.01); *H04L 63/0807* (2013.01); *H04L 63/0846* (2013.01); *H04L 2463/102* (2013.01)
(58) Field of Classification Search
  CPC ............... G06Q 30/06; G06Q 20/3274; G06Q 20/38215; G06Q 20/4014; H04L 9/3236; H04L 63/0807; H04L 63/0846; H04L 2463/102; G06F 21/31; H04W 12/04031; H04W 12/06
  See application file for complete search history.

(56) References Cited

U.S. PATENT DOCUMENTS

| | | | | |
|---|---|---|---|---|
| 8,806,198 | B1* | 8/2014 | Chaudhry | H04N 21/4627 713/158 |
| 8,905,303 | B1* | 12/2014 | Ben Ayed | G06Q 20/32 235/380 |
| 9,391,782 | B1* | 7/2016 | Mironenko | H04L 9/3247 |
| 9,792,374 | B2* | 10/2017 | Xia | H04L 63/20 |
| 10,192,216 | B2* | 1/2019 | Hammad | G06Q 20/3226 |
| 10,269,017 | B1* | 4/2019 | Phillips | H04L 63/0492 |
| 2007/0198434 | A1* | 8/2007 | Jang | G06F 21/10 705/67 |
| 2009/0292641 | A1* | 11/2009 | Weiss | G06Q 20/385 705/66 |
| 2010/0125509 | A1* | 5/2010 | Kranzley | G06Q 40/00 705/17 |
| 2010/0142711 | A1* | 6/2010 | Weis | H04L 9/0833 380/277 |
| 2010/0229224 | A1* | 9/2010 | Etchegoyen | G06F 21/31 726/5 |
| 2012/0215700 | A1* | 8/2012 | Falk | G06Q 20/3276 705/67 |
| 2013/0179352 | A1* | 7/2013 | Dwyre | G06Q 20/327 705/71 |
| 2013/0238503 | A1* | 9/2013 | Patel | G06Q 20/3224 705/44 |
| 2013/0282589 | A1* | 10/2013 | Shoup | H04L 63/08 705/67 |
| 2014/0006273 | A1* | 1/2014 | Gopinath | G06Q 20/10 705/40 |
| 2014/0040133 | A1* | 2/2014 | Lee | G06Q 20/40 705/44 |
| 2014/0070001 | A1* | 3/2014 | Sanchez | G06Q 40/025 235/380 |
| 2014/0104139 | A1* | 4/2014 | Buchner | G06F 3/1438 345/1.3 |
| 2014/0143150 | A1* | 5/2014 | Karlov | G06Q 20/42 705/44 |
| 2015/0073907 | A1* | 3/2015 | Purves | G06F 3/011 705/14.58 |
| 2015/0100528 | A1* | 4/2015 | Danson | G06N 5/04 706/21 |
| 2015/0339696 | A1* | 11/2015 | Zhou | G06Q 20/405 705/14.23 |
| 2016/0019536 | A1* | 1/2016 | Ortiz | G06Q 20/3227 705/67 |
| 2016/0086176 | A1* | 3/2016 | Silva Pinto | G06Q 20/385 705/44 |
| 2016/0110695 | A1* | 4/2016 | Zhou | G06Q 20/3278 705/75 |
| 2016/0125401 | A1* | 5/2016 | Li | G06Q 10/087 235/380 |
| 2016/0132870 | A1* | 5/2016 | Xu | G06Q 20/40 705/21 |
| 2016/0189137 | A1* | 6/2016 | Zhou | G06Q 20/3276 705/14.34 |
| 2017/0076284 | A1* | 3/2017 | Wu | G06Q 20/32 |
| 2018/0068290 | A1* | 3/2018 | Xia | G06Q 20/401 |
| 2018/0276666 | A1* | 9/2018 | Haldenby | H04L 63/10 |
| 2019/0026722 | A1* | 1/2019 | Wu | G06Q 20/385 |
| 2020/0074356 | A1* | 3/2020 | Tseng | G07D 7/00 |

FOREIGN PATENT DOCUMENTS

| | | |
|---|---|---|
| CN | 102831514 | 12/2012 |
| CN | 103024762 | 4/2013 |
| CN | 103139210 | 6/2013 |
| CN | 103729765 | 4/2014 |
| CN | 103856640 | 6/2014 |
| CN | 104252675 | 12/2014 |
| GB | 2478712 | 9/2011 |
| JP | 2001344545 | 12/2001 |
| KR | 20110003105 | 1/2011 |
| TW | 201636888 | 10/2016 |

OTHER PUBLICATIONS

Search Report and Written Opinion issued by the Intellectual Property Office of Singapore in Singapore Application No. 11201709332U dated Aug. 6, 2018; 10 pages.
European Extended Search Report in European Application No. 16799170.2, dated Oct. 15, 2018, 9 pages.
International Search Report by the ISA issued in International Application No. PCT/CN2016/080017 dated Jul. 20, 2016; 8 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

TRANSACTION SCHEME FOR OFFLINE PAYMENT

This application is a continuation of PCT Application No. PCT/CN2016/080017, filed on Apr. 22, 2016, which claims priority to Chinese Patent Application No. 201510272052.9, filed on May 25, 2015, and each application is incorporated by reference in its entirety.

BACKGROUND

Advances in network science and technology enabled development of safe and convenient network payment methods. Network payment methods include transmission of payment data between multiple devices. For example, purchasing transactions can be completed by transmitting payment data online in real time from a client device to a payment server terminal over a network. However, a client device that cannot connect to a network cannot communicate with the payment server terminal, which prevents completion of the purchasing transaction. Additionally, a client device that is in an offline state, even if capable of connection to a network, it cannot communicate with the payment server terminal, which also prevents completion of the payment.

SUMMARY

Implementations of the present disclosure include computer-implemented methods for completing purchasing transactions in offline mode. In some implementations, an authentication factor is received, including an authentication key, an account information of a user, and a dynamic time factor. A bound authentication information is generated by using the authentication factor and a device information of a client device that requested the secure offline payment. The bound authentication information is transmitted to a service server system perform an offline payment authorization based on the bound authentication information. In response to a successful offline payment authorization, a graphical identifier is generated for completing the secure offline payment associated with the authentication factor, where the graphical identifier includes the bound authentication information and a dynamic password generated based on the dynamic time factor.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. A first aspect, combinable with any of the following aspects, includes displaying the graphical identifier by a client device in an offline state. In a second aspect, combinable with any of the previous or following aspects, the displaying mode of the graphical identifier includes one of a bar code and a quick response code. In a third aspect, combinable with any of the previous or following aspects, the displaying mode of the graphical identifier is configured to switch between the bar code and the quick response code. In a fourth aspect, combinable with any of the previous or following aspects, the authentication factor is generated by the service server system. In a fifth aspect, combinable with any of the previous or following aspects, the dynamic password remains unchanged in a same time window, and in a next time window, the dynamic password is updated according to the dynamic time factor, to change dynamically. In a sixth aspect, combinable with any of the previous or following aspects, the dynamic password is determined by using at least an authentication key of the user and the dynamic time factor.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Implementations of the present disclosure are generally directed to completion of purchasing transactions in an offline mode. More particularly, implementations of the present disclosure are directed to providing offline authorization information to process a payment request using a client device that is in an offline mode.

Implementations can include actions of receiving an authentication factor comprising an authentication key, an account information of a user, and a dynamic time factor, generating a bound authentication information by using the authentication factor and a device information of a client device that requested the secure offline payment, transmitting to a service server system, the bound authentication information to perform an offline payment authorization based on the bound authentication information, and in response to successful offline payment authorization, generating, by the one or more processors, a graphical identifier for completing the secure offline payment associated with the authentication factor, the graphical identifier comprising the bound authentication information and a dynamic password generated based on the dynamic time factor. Given that a client device can be in an offline mode when a payment operation is requested, safe and secure completion of the payment can be challenging. For example, a client device that cannot connect to a network cannot communicate with the service (payment) server system, which could prevent completion of the payment. Implementations of the present disclosure address this challenge. For example, in accordance with implementations of the present disclosure, in order to increase safe and secure offline payments a graphical identifier is generated by the client device that is in offline mode. The graphical identifier is transmitted by a second client device or a customer server system to the service server system to authorize offline payments. The authorization process includes generation and processing of dynamic and/encrypted data that enhance security of the payment process.

The following detailed description is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Figure 1:
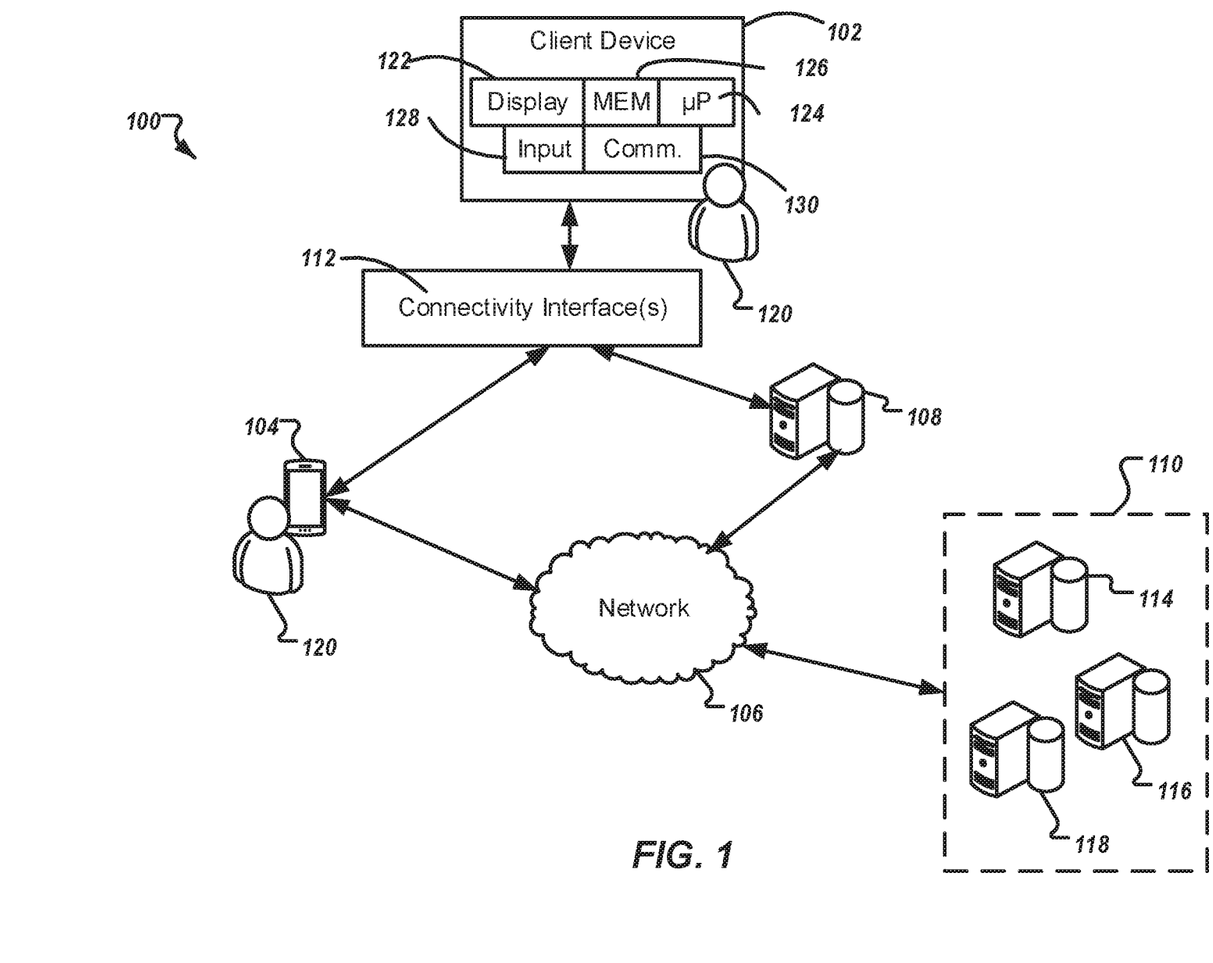
FIG. 1 depicts an example of an architecture that can be used to execute implementations of the present disclosure.

FIG. 1 depicts an example of an architecture 100 that can be used to execute implementations of the present disclosure. In the depicted example, the example architecture 100 includes client devices 102, 104, a network 106, a customer server system 108, a service server system 110, and a connectivity interface 112. The service server system 110 includes one or more server devices 114, 116, 118. In the depicted example, a user 120 interacts with the client devices 102, 104. In an example context, the user 120 can include a user (buyer), who interacts with the client devices 102, 104 for purchasing a product or a service offered by a customer (merchant) by accessing a payment application (or "service") that is hosted by the service server system 110.

Client device 102 can be configured to be in an offline mode, in which client device 102 cannot directly access the network 106. As discussed in further detail herein, client devices 102, 104 are configured to enable in-between data transfer through the connectivity interface(s) 112. Client device 104 can communicate with the server systems 108, 110 through the network 106. In some implementations, the data can be transferred from the client device 102 through the connectivity interface(s) 112 to the customer server system 108.

The client devices 102, 104 can include any number of example devices. Such example devices include, but are not limited to, a mobile phone, a smart watch, a smartphone, a tablet computing device, a personal digital assistant (PDA), a laptop personal computer (PC), a desktop PC, and/or appropriate combinations thereof. In the depicted example, the client device 102 includes a display 122, a processor 124, memory 126, an input interface 128, and a communication interface 130. The display 122 can be configured to display a graphical identifier that can enable a payment service (for example, a purchasing transaction) when the client device 102 is in an offline mode. The processor 124 can process instructions for execution of implementations of the present disclosure. The instructions can include, but are not limited to, instructions stored in the memory 126 to display graphical information on the display 122. Example displays include, but are not limited to, a thin-film-transistor (TFT) liquid crystal display (LCD), or an organic light emitting diode (OLED) display. The memory 126 stores information within the client device 102. In some implementations, the memory 126 can include a volatile memory unit or units, and/or a non-volatile memory unit or units. In other implementations, removable memory can be provided, and can include, but is not limited to, a memory card. Example memory cards can include, but are not limited to, a secure digital (SD) memory card, a mini-SD memory card, a USB stick, and the like. In some implementations, the input interface 128 can include a camera, a code scanner, a keyboard, a touchscreen, a mouse, a trackball, a microphone, a touchpad, and/or appropriate combinations thereof.

The client device 102 may communicate wirelessly with the communication interface(s) 112 through the communication interface 130, which can include digital signal processing circuitry. The communication interface 130 may provide communications under various modes or protocols including, but not limited to, GSM voice calls, SMS, EMS or MMS messaging, CDMA, TDMA, PDC, WCDMA, CDMA2000, and/or GPRS. Such communication may occur, for example, through a radio-frequency transceiver (not shown). Further, the client device 102 can be capable of short-range communication using features including, but not limited to, Bluetooth and/or WiFi transceivers (not shown).

The client device 102 communicates with the client device 104 and the customer server system 108 through the connectivity interface(s) 112. In some implementations, the connectivity interface(s) 112 can include a scanner (for example, a camera), a radio frequency transceiver, a satellite receiver, a cellular network, a Bluetooth system, a Wi-Fi system (for example, 802.x), a cable modem, a DSL/dial-up interface, a private branch exchange (PBX) system, and/or appropriate combinations thereof. Each of these connectivity interfaces 112 enables data to be transmitted from the client device 102 to the client device 104 or the customer server system 108. In some implementations, the client device 104 can communicate with one or more of the server devices 108, 110 over the network 106. In some implementations, the network 106 can be provided as a local area network (LAN), a wide area network (WAN), a wireless LAN (WLAN), a metropolitan area network (MAN), a personal area network (PAN), the Internet, and/or combinations thereof.

In some implementations, the customer server device 108 and at least one of the server devices 114, 116, 118 includes an application that is configured to enable an offline payment process. In some implementations, the server system 110 can be provided by a third-party service provider, which stores and provides online and offline payment services to clients (buyers) and customers (merchants). In the example depicted in FIG. 1, the server devices 114, 116, 118 are intended to represent various forms of servers including, but not limited to, a web server, an application server, a proxy server, a network server, or a server pool. In general, server systems accept requests for application services (such as, purchasing orders, offline payment services or offline banking services) and provides such services to any number of client devices (for example, the client devices 102, 104) over the network 106.

In accordance with implementations of the present disclosure, the server system 110 can host an offline payment algorithm (for example, provided as one or more computer-executable programs executed by one or more computing devices) that can be applied before completing a service request. For example, input data including graphical identifiers can be provided to the server system 110 (for example, from the customer server system 108), and the server system 110 can process the input data through the payment service to provide result data. For example, the server system 110 can send the result data to the customer server system 108 over the network 106 for completing a transaction.

Figure 2A:
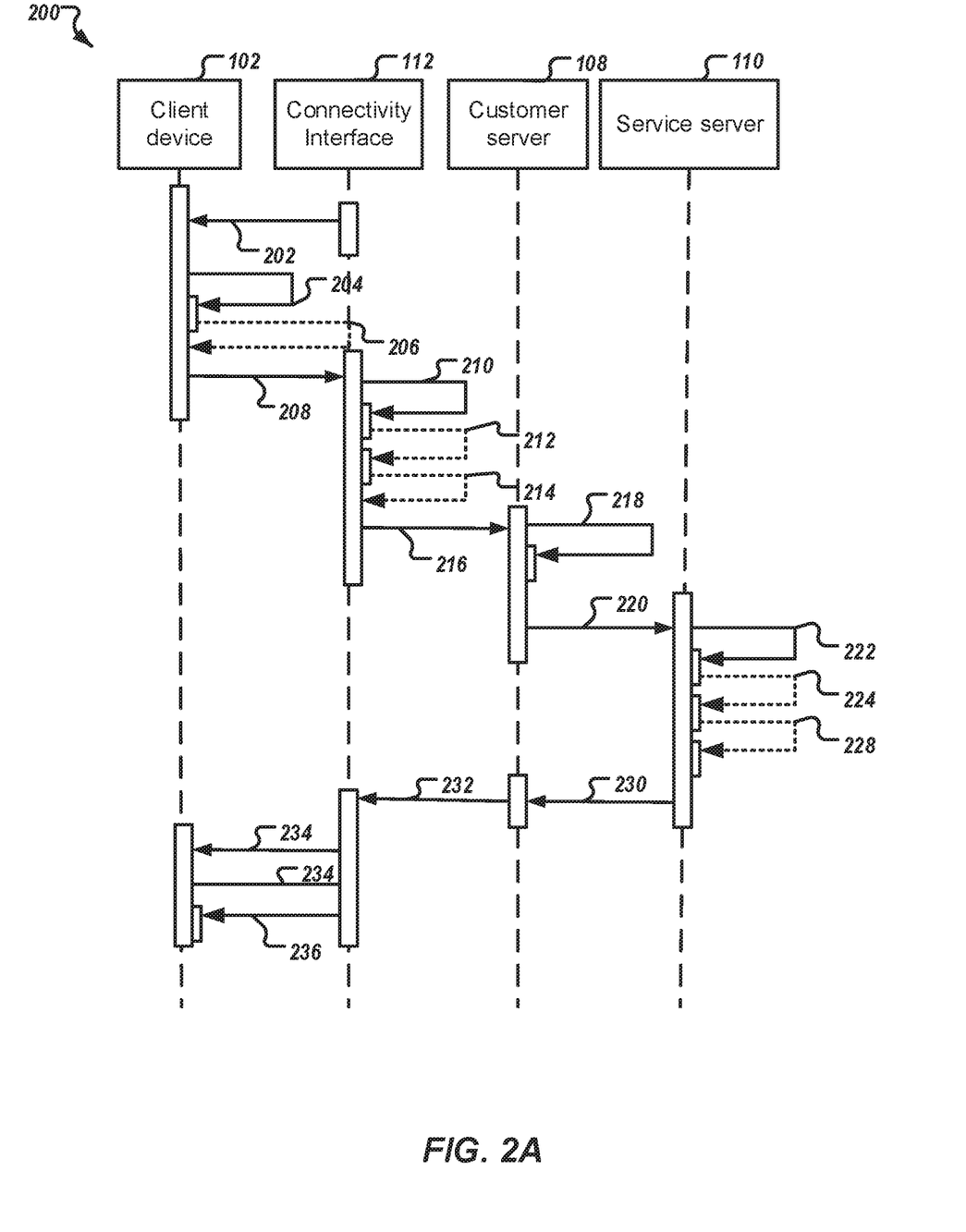
FIGS. 2A-2C depict examples of sequence diagrams in accordance with implementations of the present disclosure.
Figure 2B:
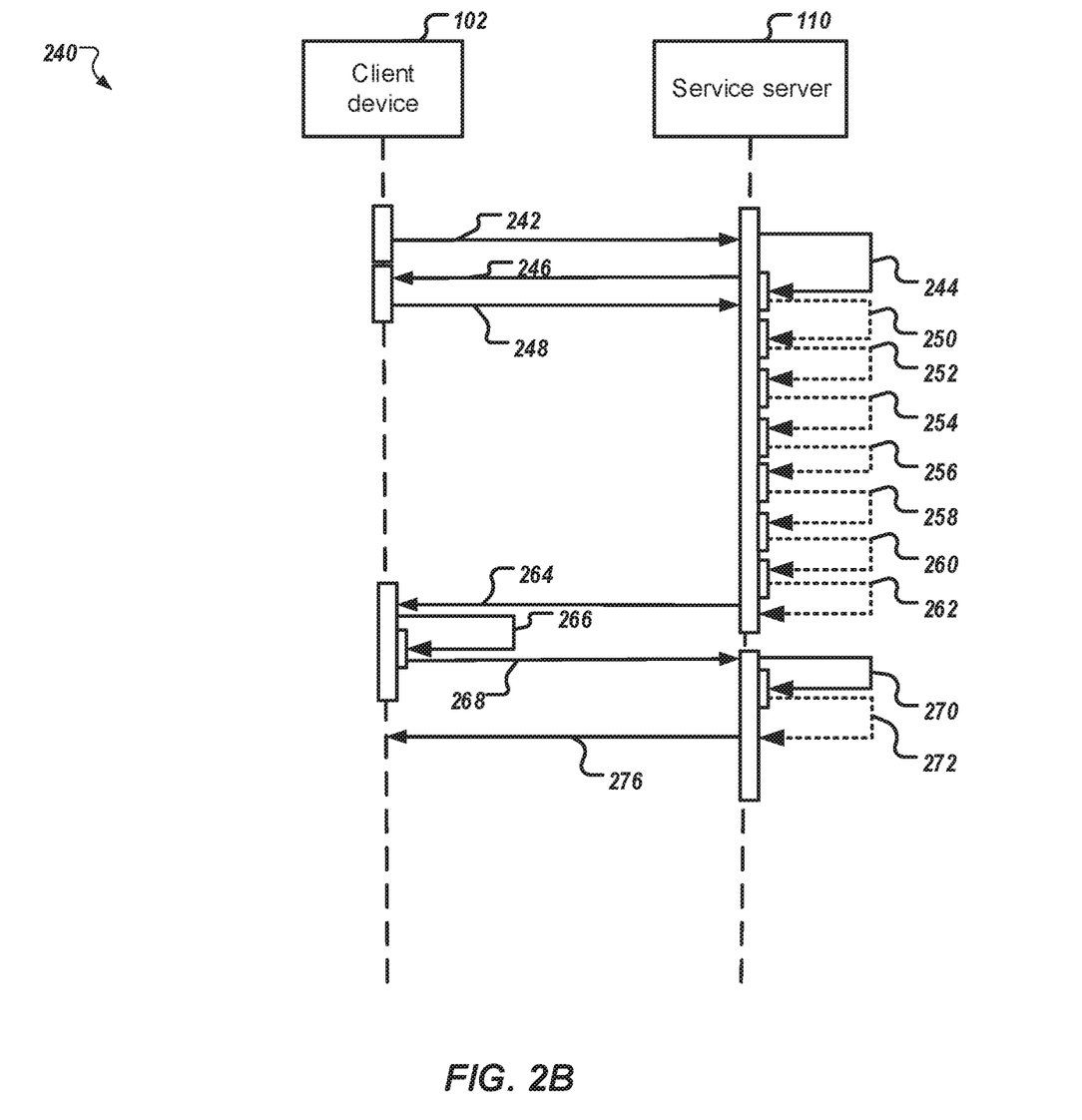
Figure 2C:
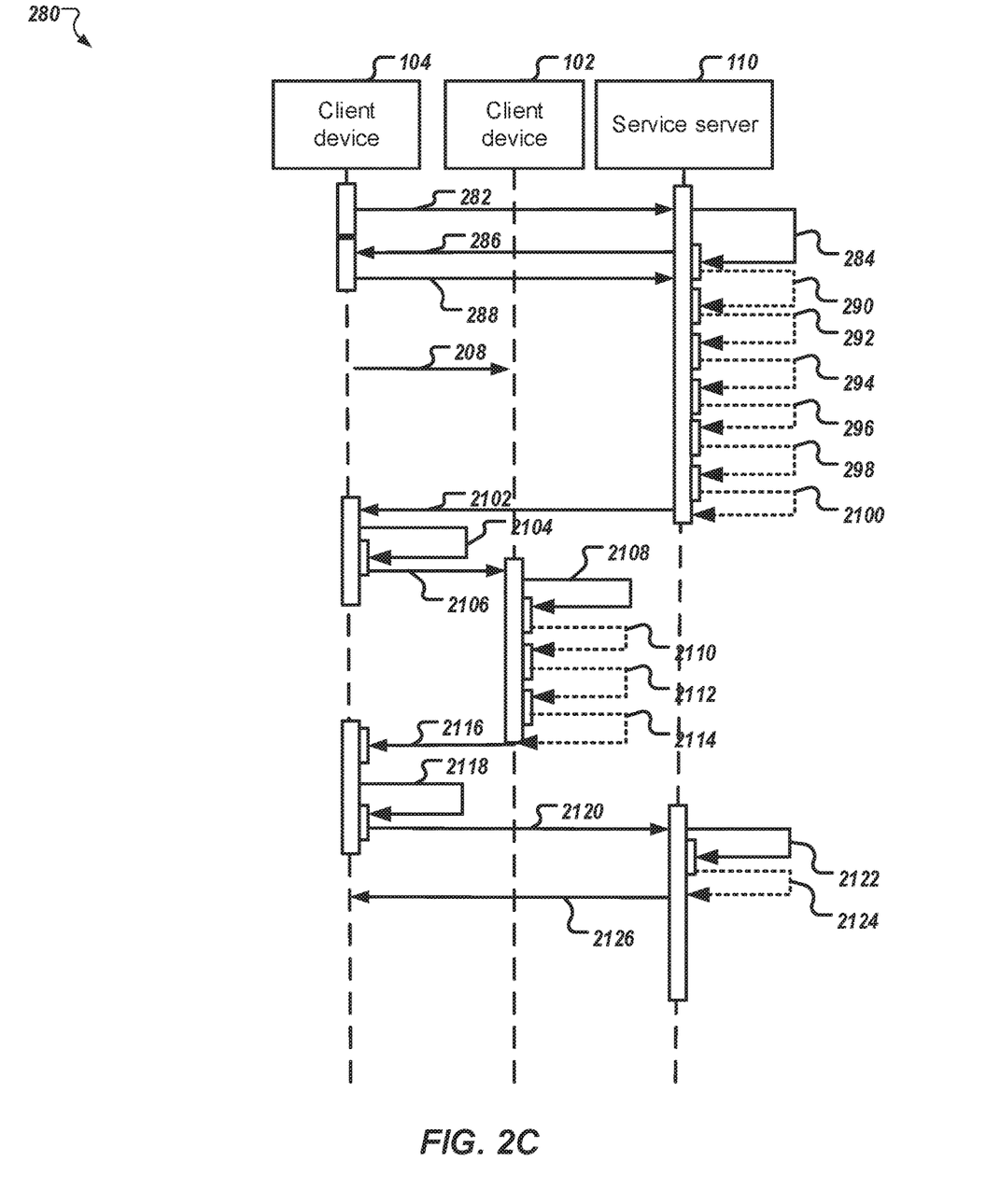

FIGS. 2A-2C depict an example of sequence diagrams 200, 240, and 280 in accordance with implementations of the present disclosure. As shown in FIG. 2A, components of the example architecture 200 include the client devices 102, 104, the customer server system 108, and the service server system 110. In accordance with implementations of the present disclosure, the example sequence of the sequence diagrams 200 and 230 perform operations that enable an offline payment. In some implementations, the process 200, 240, and 280 can be initiated by the customer server system 108 or a client device 102, 104. In the depicted example, the process is initiated by the customer server system 108.

In the sequence diagram 200 shown in FIG. 2A, the connectivity interface 112 generates a purchase order (202). The purchase order includes an order amount and an order content. In response to generating the purchase order, the connectivity interface 112 transmits to the client device 102 a request for a purchase identifier. The client device 102 receives a display request for displaying a graphical identifier for offline purchasing (204). In response to receiving the request, the client device 102 launches a presentation interface of the graphical identifier. After a user determines the content and amount of an order with a merchant, the user operates the client device 102 to display the graphical identifier for offline payment. The client device 102 receives the display instruction of the user, and switches to the presentation interface of the graphical identifier.

The client device 102 generates a payment authentication information using a stored authentication factor (206). The payment authentication information can include payment authentication information presented in the form of a bar-code. The bar code can be a matrix (two-dimensional) barcode, such as a quick response (QR) code or a universal product (UPC) code. The client device 102 displays the graphical identifier on the display interface (208). The graphical identifier type can be selected based on a reading capability or setting of the connectivity interface 112. For example, the graphical identifier can be a code with a format readable by a type of a code-scanning gun used for code scanning. The connectivity interface 112 captures (for example, scans) the graphical identifier displayed by the client device 102 (210). The connectivity interface 112 processes the graphical identifier to acquire the payment authentication information (212). The connectivity interface 112 processes the payment authentication information in association with the order information (214). The connectivity interface 112 generates a payment request (216) and sends the payment request to the customer server system 108. The customer server system 108 verifies the payment request received from the connectivity interface 112 (218).

The customer server system 108 extracts the payment authentication information and order service information, generates a payment request, and sends the payment request to the service server system 110 (220). The service server system 110 extracts, from the payment request, the payment authentication information and merchant information in the order service information (222). The service server system 110 authenticates the payment authentication information (224). In response to a successful authentication, the service server system 110 performs payment operations. The service server system 110 returns a payment result to the customer server 108 (230). The customer server 108 returns a payment result to the connectivity interface 112 (232). The connectivity interface 112 confirms to the client device 102 the payment result (234). The client device 102 completes the payment (236), and the customer delivers the purchased commodity (for example, item or service).

In the sequence diagram 240 shown in FIG. 2B, the client device 102, when in an online state, sends an account identity verification request to a service server system 110 (242). The account identity verification request includes account information (for example, user identifier or user name and user password) of a user of the client device 102. The service server system 110 verifies the account identity verification request (244). If the verification is successful, the result of successful verification is sent to the client device 102 otherwise, the process ends with failure (246). The client device 102 sends a verification request for offline payment authorization to the service server system 110 (248). The service server system 110 verifies the offline payment authorization request (250). In response to successfully verifying the offline payment authorization request offline payment protocol is initiated (252).

The service server system 110 generates an authentication key of the user (254). The service server system 110 generates a compressed string from the authentication key and the account information (256). The service server system 110 calculates a server time to determine a dynamic time factor of the service server system 110 (258). The service server system 110 generates an authentication factor (260). The authentication factor (AF) is generated by using an authentication key (Key), a compressed string (Seq), and a dynamic time factor (timestamp). The authentication key includes a key used by the user of the client device. Seq includes a compressed string of the device identification information and the account identification information. UserId represents the account identification information. DID represents device identification information. N represents a preset password length. ZIP includes a statistical function that defines a one-to-one mapping relationship. OTP represents a dynamic password obtained through calculation according to a Hash Message Authentication Code (HMAC) based on a One-Time Password (HOTP) algorithm. Tag represents an authentication information tag. In some implementations, the authentication factor is obtained through a combination of the authentication information tag, the compressed string, and the dynamic password by using the following equations:

$$Seq=ZIP(UserId, DID),$$

$$OTP=HOTP(Key, Tag+Seq+timestamp, N), \text{ and}$$

$$AF=Tag+Seq+OTP.$$

The service server system 110 performs encryption of the authentication factor (262). The service server system 110 transmits the authentication factor to the client device 102 (264). The client device 102 generates a bound authentication information by binding the authentication factor to the client account information (266). The client device 102 transmits the bound authentication information to the service server system 110 (268).

The service server system 110 parses the bound authentication information and validates the offline payment authorization for the user account, using the authentication key and the dynamic time factor (270). In response to successfully verifying the offline payment authorization, the service server system 110 performs the payment; otherwise, the process is ended without payment completion (272). In response to successfully completing the offline payment, the service server system 110 transmits a payment confirmation to the client device 102 (276).

In the sequence diagram 280 shown in FIG. 2C, the client device 102 is in offline mode and can communicate with the client device 104, but cannot communicate directly with a service server system 110. The client device 104 can communicate with the service server system 110 and sends an account identity verification request to a service server system 110 (282). The account identity verification request includes account information (for example, user identifier or user name and user password) of a user of the client device 104. The service server system 110 verifies the account identity verification request (284). If the verification is successful, the result of successful verification is sent to the client device 104 otherwise, the process ends with failure (286). The client device 104 sends a verification request for offline payment authorization to the service server system 110 (288). The service server system 110 verifies the offline payment authorization request (290). In response to successfully verifying the offline payment authorization request offline payment protocol is initiated (292).

The service server system 110 generates an authentication key of the user (294). The service server system 110 calculates a server time to determine a dynamic time factor of the service server system 110 (296). The service server system 110 generates an authentication factor by using the authentication key, the dynamic time factor, and the account information of the user (298). The service server system 110 performs encryption of the authentication factor (2100). The service server system 110 transmits the authentication factor to the client device 104 (2102).

The client device 104 writes the authentication factor (2104) and transmits it to a client device 102, and the client device 102 receives the authentication factor (2106). The client device 102 encrypts the authentication factor (2108) and stores the encrypted authentication factor (2110). The client device 102 generates bound authentication information by using the authentication factor (2112). The client device 102 transmits the bound authentication information of the client device 102 (2114). The client device 102 sends the bound authentication information to the client device 104 (2116).

The client device 104 processes the bound authentication information (2118) and transmits the processed bound authentication information to the service server system 110 (2120). The service server system 110 parses the bound authentication information and validates the offline payment authorization for the user account, using the authentication key and the dynamic time factor (2122). In response to successfully verifying the offline payment authorization, the service server system 110 performs the payment; otherwise, the process is ended without payment completion (2124). In response to successfully completing the offline payment, the service server system 110 transmits a payment confirmation to the client device 104 (2126).

Figure 3:
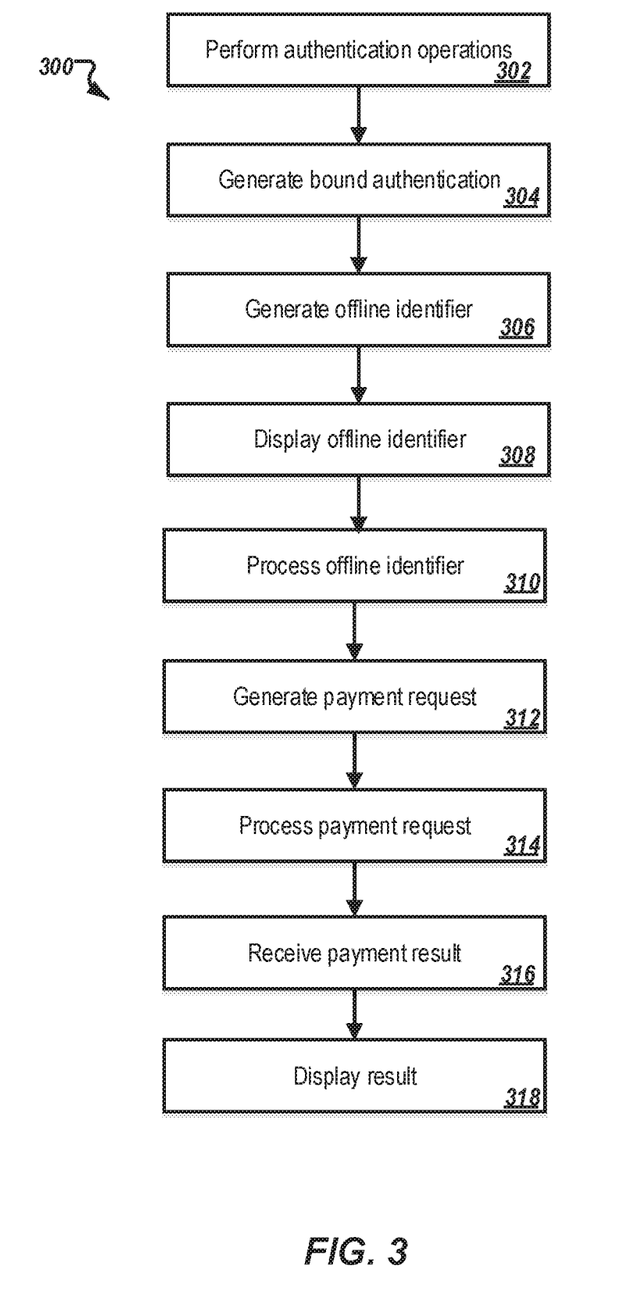
FIG. 3 is a flowchart illustrating an example of a method, according to an implementation of the present disclosure.

FIG. 3 is a flowchart illustrating an example of a method 300 for matching address information for payment, according to an implementation of the present disclosure. Method 300 can be implemented as one or more computer-executable programs executed using one or more computing devices, as described with reference to FIGS. 1 and 2. In some implementations, various steps of the example method 300 can be run in parallel, in combination, in loops, or in any order.

At 302, a client device and a service server system perform a plurality of authentication operations, while the client device is in online mode, to generate an authentication factor to be used for offline payments. The client device includes a mobile device that can directly connect to the service server system or a client device (for example, watch) that can connect to a second client device that can directly connect to the service server system. The service server system includes a server client device configured to perform service operations after authenticating the client device requesting the service operation. The service operation includes network exchange operations for virtual resources, such as payment amount and discounts (for example, vouchers, credits, sales, etc.). The service operation includes offline payment as an example of an offline service operation. The authentication operations include establishing, by the client device in an online state, a network connection to the service server system. The authentication operations further include sending, by the client device, an account identity verification request to the service server system. The authentication operations further include verifying, by the service server system, the account identity. The authentication operations further include in response to successful account verification, receiving, by the client device, a verification result. The authentication operations further include sending, by the client device, a request for offline payment authorization to the service server system. The authentication operations further include in response to successful offline authorization verification receiving, by the client device, an authentication factor issued by the service server system after verification is successful.

The authentication factor that includes an authentication key, an account information of a user, and a dynamic password. The account information is generated according to the account information of the user. The dynamic password is generated according to a dynamic time factor. The dynamic password remains unchanged within a selected time window. Once the time exceeds the selected time window, the dynamic password is updated based on the dynamic time factor, to change dynamically. The dynamic change of the password enhances the safety of the payment authentication information, thereby achieving the purpose of anti-counterfeiting. The dynamic password is specifically obtained through calculation by using the authentication key of the user, the dynamic time factor, the device account information, and a preset password length according to a one-time password calculating method. The device account information is generated based on the account information of the user and the device information of the client device. The authentication factor can be stored by both the client device and the service server system to enable safe and convenient payment when the client device is in an offline state. From 302, method 300 proceeds to 304.

At 304, the client device, when being in an offline mode, generates a bound authentication information by using the authentication factor and device information of the client device. The bound authentication information is sent to the service server system. The service server system performs authorization of an offline service operation based on the bound authentication information. From 304, method 300 proceeds to 306.

At 306, a graphical identifier is generated for completing the offline service operation based on the bound authentication information. The graphical identifier includes authentication information of the offline service operation. The graphical identifier includes a code, such as a bar code or a QR code. If the graphical identification is a QR code, the graphical identifier includes a large amount of information that increases the preset password length of the one-time password, which enhances the safety of the offline payment process. From 306, method 300 proceeds to 308.

At 308, the client device in an offline state, when needing to perform payment, displays the graphical identifier for offline payment. In some implementations, the display of the graphical identifier includes a switch option for the displaying mode of the graphical identifier. The switch option enables the change of the graphical identifier display from a bar code to a QR code or vice versa. From 308, method 300 proceeds to 310.

At 310, the customer server system scans and processes the graphical identifier to acquire the payment authentication information. The customer server system processes the graphical identifier, to complete offline payment through the service server system. From 310, method 300 proceeds to 312.

At 312, the customer server system generates a payment request and sends the payment request to the service server system. From 312, method 300 proceeds to 314.

At 314, the service server system receives and processes the payment request. The service server system processes the payment request by extracting from the payment request, the payment authentication information and merchant information in the order service information. The service server system authenticates the payment information by verifying whether a binding relationship between the device account information and the authentication key that are carried in the payment authentication information is correct, and by verifying whether the dynamic password is valid according to the dynamic time factor in the authentication factor. If the binding information is correct and the dynamic password is valid, the payment authentication is successful. In response to completing the payment request processing, the service server system generates a payment result. The payment result can include an indication of validity of the payment information. From 314, method 300 proceeds to 316.

At 316, the service server system returns a payment result to the customer server. The customer server returns a payment result to the client device. From 316, method 300 proceeds to 318.

At 318, the client device displays the payment result and enables a user to generate a user input to complete the payment. In response to completing the payment, the customer delivers the purchased commodity (for example, item or service). After 318, method 300 stops.

Figure 4:
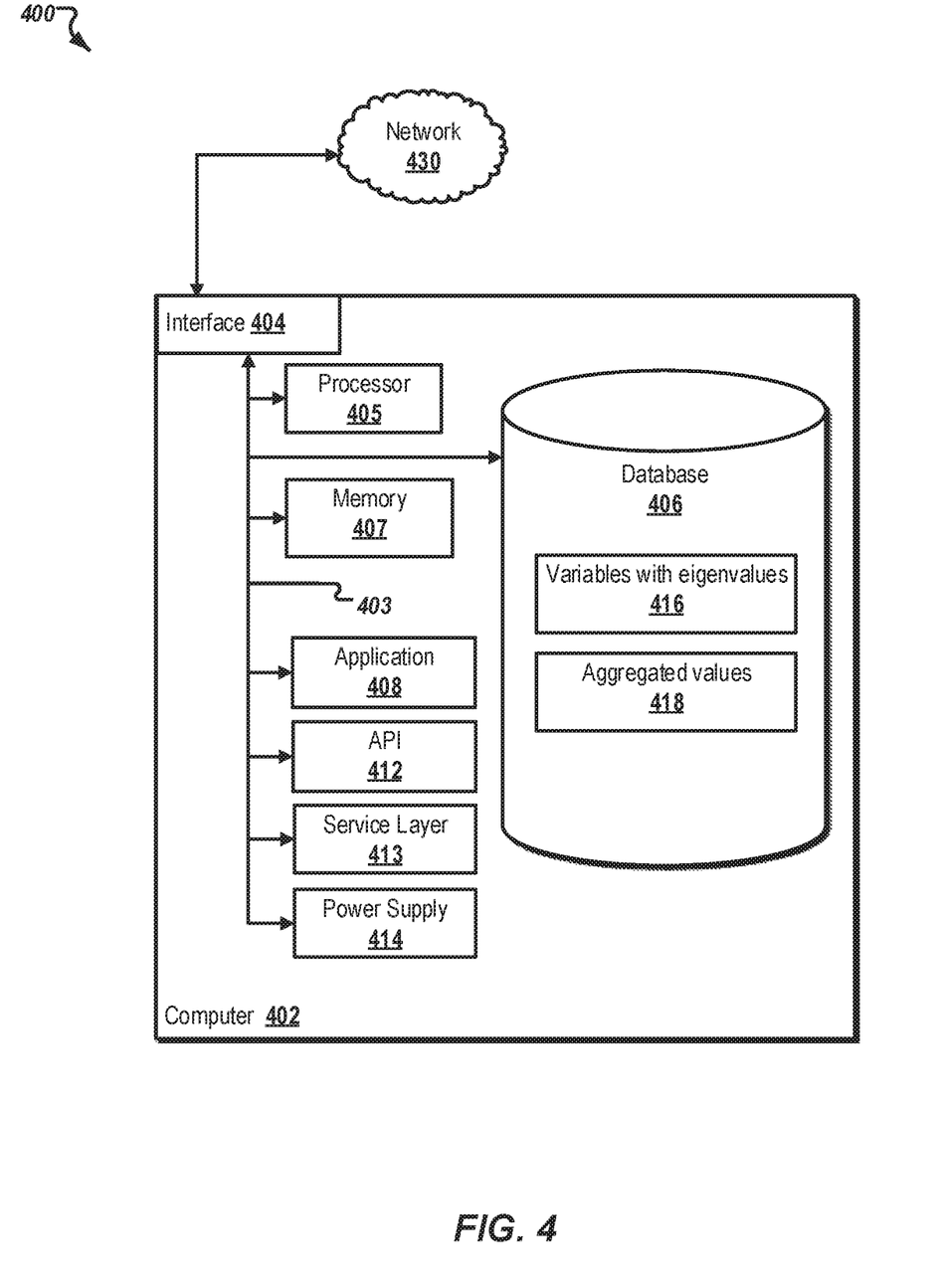
FIG. 4 is a block diagram illustrating an example of a computer system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing the subject matter described in the present disclosure. The illustrated Computer 402 is communicably coupled with a Network 430. In some implementations, one or more components of the Computer 402 can be configured to operate within an environment, including cloud-computing-based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, e-mail server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application-programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, conventional, or another type of database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. As illustrated, the database 406 holds previously described variables with eigenvalues 416 and aggregated data 418.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method for secure offline payment that is executed by one or more processors includes: receiving, by the one or more processors, an authentication factor including an authentication key, an account information of a user, and a dynamic time factor, generating, by the one or more processors, a bound authentication information by using the authentication factor and a device information of a client device that requested the secure offline payment, transmitting, by the one or more processors to a service server system, the bound authentication information to perform an offline payment authorization based on the bound authentication information, and in response to successful offline payment authorization, generating, by the one or more processors, a graphical identifier for completing the secure offline payment associated with the authentication factor, the graphical identifier including the bound authentication information and a dynamic password generated based on the dynamic time factor.

The foregoing and other described implementations can each, optionally, include one or more of the following features:

A first feature, combinable with any of the following features, includes displaying the graphical identifier by a client device in an offline state.

In a second feature, combinable with any of the previous or following features, the displaying mode of the graphical identifier includes one of a bar code and a quick response code.

In a third feature, combinable with any of the previous or following features, the displaying mode of the graphical identifier is configured to switch between the bar code and the quick response code.

In a fourth feature, combinable with any of the previous or following features, the authentication factor is generated by the service server system.

In a fifth feature, combinable with any of the previous or following features, the dynamic password remains unchanged in a same time window, and in a next time window, the dynamic password is updated according to the dynamic time factor, to change dynamically.

In a sixth feature, combinable with any of the previous or following features, the dynamic password is determined by using at least an authentication key of the user and the dynamic time factor.

In a second implementation, a non-transitory, computer-readable medium storing one or more instructions executable by a computer system to perform operations includes: receiving an authentication factor that includes an authentication key, an account information of a user, and a dynamic time factor, generating a bound authentication information by using the authentication factor and a device information of a client device that requested a secure offline payment, transmitting, to a service server system, the bound authentication information to perform an offline payment authorization based on the bound authentication information, and in response to successful offline payment authorization, generating a graphical identifier for completing the secure offline payment associated with the authentication factor, the graphical identifier includes the bound authentication information and a dynamic password generated based on the dynamic time factor.

The foregoing and other described implementations can each, optionally, include one or more of the following features:

A first feature, combinable with any of the following features, includes displaying the graphical identifier by a client device in an offline state.

In a second feature, combinable with any of the previous or following features, the displaying mode of the graphical identifier includes one of a bar code and a quick response code.

In a third feature, combinable with any of the previous or following features, the displaying mode of the graphical identifier is configured to switch between the bar code and the quick response code.

In a fourth feature, combinable with any of the previous or following features, the authentication factor is generated by the service server system.

In a fifth feature, combinable with any of the previous or following features, the dynamic password remains unchanged in a same time window, and in a next time window, the dynamic password is updated according to the dynamic time factor, to change dynamically.

In a sixth feature, combinable with any of the previous or following features, the dynamic password is determined by using at least an authentication key of the user and the dynamic time factor.

In a third implementation, a computer-implemented system for secure offline payment, includes: one or more computers, and one or more computer memory devices interoperably coupled with the one or more computers and having tangible, non-transitory, machine-readable media storing instructions that, when executed by the one or more computers, perform operations that include: receiving an authentication factor that includes an authentication key, an account information of a user, and a dynamic time factor, generating a bound authentication information by using the authentication factor and a device information of a client device that requested the secure offline payment, transmitting, to a service server system, the bound authentication information to perform an offline payment authorization based on the bound authentication information, and in response to successful offline payment authorization, generating a graphical identifier for completing the secure offline payment associated with the authentication factor, the graphical identifier includes the bound authentication information and a dynamic password generated based on the dynamic time factor.

The foregoing and other described implementations can each, optionally, include one or more of the following features:

A first feature, combinable with any of the following features, includes displaying the graphical identifier by a client device in an offline state.

In a second feature, combinable with any of the previous or following features, the displaying mode of the graphical identifier includes one of a bar code and a quick response code.

In a third feature, combinable with any of the previous or following features, the displaying mode of the graphical identifier is configured to switch between the bar code and the quick response code.

In a fourth feature, combinable with any of the previous or following features, the authentication factor is generated by the service server system.

In a fifth feature, combinable with any of the previous or following features, the dynamic password remains unchanged in a same time window, and in a next time window, the dynamic password is updated according to the dynamic time factor, to change dynamically.

In a sixth feature, combinable with any of the previous or following features, the dynamic password is determined by using at least an authentication key of the user and the dynamic time factor.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client-computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by a service server system, an account identity verification request from a first online client device, the account identity verification request comprising account information associated with a user of the first online client device;
   receiving, by the service server system, a verification request from the first online client device for offline payment authorization;
   transmitting, by the service server system to the first online client device, an authentication factor generated by performing an encryption using:
      an authentication key of a user of the first online client device,
      a character string comprising account information of the user and device information of the first online client device that requested a secure offline payment, and
      a dynamic time factor generated based on a server time of the service server system;
   receiving, by a second offline client device using a connectivity interface, the authentication factor from the first online client device, the second offline client device not having online communication with the service server system;
   generating, by the second offline client device, bound authentication information by using the authentication factor and the device information of the first online client device that requested the offline payment authorization;

receiving, by the first online client device using the connectivity interface, the bound authentication information from the second offline client device;

transmitting, by the first online client device to the service server system, the bound authentication information to perform an offline payment authorization based on the bound authentication information;

in response to successful offline payment authorization, generating, by the second offline client device and based upon receiving display instruction from the first online client device, a graphical identifier for completing the secure offline payment associated with the authentication factor; and displaying, by the second offline client device as a graphical identifier, the graphical identifier, in which a display mode of the graphical identifier is configured to switch between a bar code and a quick response code;

receiving, by the service server system, a payment request generated by a customer server system based upon scanning of the graphical identifier;

verifying, by the service server system, the bound authentication information and validity of a dynamic password according to the dynamic time factor; and gene rating, by the service server system, a payment result of the payment request.

2. The method of claim 1, wherein the authentication factor is generated by the service server system.

3. The method of claim 1, wherein the dynamic password remains unchanged in a same time window, and in a next time window, the dynamic password is updated according to the dynamic time factor, to change dynamically.

4. The method of claim 1, wherein the dynamic password is determined by using at least the authentication key of the user and the dynamic time factor.

5. A non-transitory, computer-readable medium storing one or more instructions executable by one or more processors to perform operations comprising:

receiving, by a service server system, an account identity verification request from a first online client device, the account identity verification request comprising account information associated with a user of the first online client device;

receiving, by the service server system, a verification request from the first online client device for offline payment authorization;

transmitting, by the service server system to the first online client device, an authentication factor generated by performing an encryption using:
an authentication key of a user of the first online client device,
a character string comprising account information of the user and device information of the first online client device that requested a secure offline payment, and
a dynamic time factor generated based on a server time of the service server system;

receiving, by a second offline client device using a connectivity interface, the authentication factor from the first online client device, the second offline client device not having online communication with the service server system;

generating, by the second offline client device, bound authentication information by using the authentication factor and the device information of the first online client device that requested the offline payment authorization;

receiving, by the first online client device using the connectivity interface, the bound authentication information from the second offline client device;

transmitting, by the first online client device to the service server system, the bound authentication information to perform an offline payment authorization based on the bound authentication information;

in response to successful offline payment authorization, generating, by the second offline client device and based upon receiving display instruction from the first online client device, a graphical identifier for completing the secure offline payment associated with the authentication factor; and displaying, by the second offline client device as a graphical identifier, the graphical identifier, in which a display mode of the graphical identifier is configured to switch between a bar code and a quick response code;

receiving, by the service server system, a payment request generated by a customer server system based upon scanning of the graphical identifier;

verifying, by the service server system, the bound authentication information and validity of a dynamic password according to the dynamic time factor; and generating, by the service server system, a payment result of the payment request.

6. The non-transitory, computer-readable medium of claim 5, wherein the authentication factor is generated by the service server system.

7. The non-transitory, computer-readable medium of claim 5, wherein the dynamic password remains unchanged in a same time window, and in a next time window, the dynamic password is updated according to the dynamic time factor, to change dynamically.

8. The non-transitory, computer-readable medium of claim 5, wherein the dynamic password is determined by using at least the authentication key of the user and the dynamic time factor.

9. A computer-implemented system, comprising:
one or more processors; and
one or more computer memory devices interoperably coupled with the one or more processors and having tangible, non-transitory, machine-readable media storing instructions that, when executed by the one or more processors, perform operations comprising:
receiving, by a service server system, an account identity verification request from a first online client device, the account identity verification request comprising account information associated with a user of the first online client device;
receiving, by the service server system, a verification request from the first online client device for offline payment authorization;
transmitting, by the service server system to the first online client device, an authentication factor generated by performing an encryption using:
an authentication key of a user of the first online client device,
a character string comprising account information of the user and device information of the first online client device that requested a secure offline payment, and
a dynamic time factor generated based on a server time of the service server system;

receiving, by a second offline client device using a connectivity interface, the authentication factor from the first online client device, the second offline client device not having online communication with the service server system;

generating, by the second offline client device, bound authentication information by using the authentication factor and the device information of the first online client device that requested the offline payment authorization;

receiving, by the first online client device using the connectivity interface, the bound authentication information from the second offline client device;

transmitting, by the first online client device to the service server system, the bound authentication information to perform an offline payment authorization based on the bound authentication information;

in response to successful offline payment authorization, generating, by the second offline client device and based upon receiving display instruction from the first online client device, a graphical identifier for completing the secure offline payment associated with the authentication factor; and displaying, by the second offline client device as a graphical identifier, the graphical identifier, in which a display mode of the graphical identifier is configured to switch between a bar code and a quick response code;

receiving, by the service server system, a payment request generated by a customer server system based upon scanning of the graphical identifier;

verifying, by the service server system, the bound authentication information and validity of a dynamic password according to the dynamic time factor; and generating, by the service server system, a payment result of the payment request.

10. The computer-implemented system of claim 9, wherein the authentication factor is generated by the service server system.

11. The computer-implemented system of claim 9, wherein the dynamic password remains unchanged in a same time window, and in a next time window, the dynamic password is updated according to the dynamic time factor, to change dynamically.

* * * * *

UNITED STATES PATENT AND TRADEMARK OFFICE
CERTIFICATE OF CORRECTION

PATENT NO. : 11,250,404 B2  
APPLICATION NO. : 15/805205  
DATED : February 15, 2022  
INVENTOR(S) : Jupeng Xia Page 1 of 1

It is certified that error appears in the above-identified patent and that said Letters Patent is hereby corrected as shown below:

In the Claims

Column 19, Line 28, in Claim 1, delete "gene rating," and insert -- generating, --.

Signed and Sealed this  
Seventh Day of June, 2022

Katherine Kelly Vidal  
*Director of the United States Patent and Trademark Office*